US011416665B2

(12) United States Patent
Huang et al.

(10) Patent No.: US 11,416,665 B2
(45) Date of Patent: Aug. 16, 2022

(54) POWER RAIL DESIGN METHOD, APPARATUS AND NON-TRANSITORY COMPUTER READABLE MEDIUM THEREOF

(71) Applicant: Realtek Semiconductor Corporation, Hsinchu (TW)

(72) Inventors: Cheng-Chen Huang, Hsinchu (TW); Yun-Ru Wu, Hsinchu (TW); Hsin-Chang Lin, Zhubei (TW); Shu-Yi Kao, Zhubei (TW); Chih-Chan Chen, Miaoli County (TW); Chia-Jung Hsu, Hsinchu (TW); Li-Yi Lin, Changhua County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/077,333

(22) Filed: Oct. 22, 2020

(65) Prior Publication Data
US 2021/0124864 A1   Apr. 29, 2021

(30) Foreign Application Priority Data

Oct. 23, 2019   (TW) .................................. 108138294

(51) Int. Cl.
*G06F 30/392*   (2020.01)
*G06F 30/398*   (2020.01)
(Continued)

(52) U.S. Cl.
CPC .......... *G06F 30/392* (2020.01); *G06F 30/394* (2020.01); *G06F 30/398* (2020.01); *G06F 2119/06* (2020.01)

(58) Field of Classification Search
CPC .. G06F 30/398; G06F 30/392; G06F 2119/06; G06F 30/367; G06F 30/39; G06F 30/327; G06F 30/33; G06F 30/394; G06F 2119/12; G06F 30/36; G06F 30/20; G06F 1/10; G06F 2115/06; G06F 30/30;
(Continued)

(56) References Cited

U.S. PATENT DOCUMENTS 7,989,849 B2    8/2011   Sherlekar et al.
8,276,109 B2 *  9/2012   Penzes .................... G06F 30/39
                                                   716/132

(Continued)

FOREIGN PATENT DOCUMENTS

TW          201730799 A      9/2017

*Primary Examiner* — Binh C Tat
(74) *Attorney, Agent, or Firm* — Locke Lord LLP; Tim Tingkang Xia, Esq.

(57) ABSTRACT

A power rail design method is disclosed that includes the steps outlined below. A plurality of power rails and a plurality of power domains corresponding thereto in an integrated circuit design file are identified. A design rule check for a plurality of circuit units in the integrated circuit design file is performed to retrieve a plurality of non-violating circuit regions that correspond to the power rails in each of the power domains. The power rails corresponding to at least part of the plurality of non-violating circuit regions in the integrated circuit design file are widened to occupy at least part of the non-violating circuit regions for the plurality of power rails.

11 Claims, 3 Drawing Sheets

(51) Int. Cl.
*G06F 30/394* (2020.01)
*G06F 119/06* (2020.01)

(58) Field of Classification Search
CPC ............... G06F 30/337; G06F 2111/02; G06F 2117/02; G06F 2119/08; G06F 9/5072; G06F 1/08; G06F 2111/04; G06F 2111/06; G06F 2111/12; G06F 2113/18; G06F 2113/20; G06F 2111/20; G06F 2119/10; G06F 30/396; G06F 1/324; G06F 2111/10; G06F 2119/02; G06F 30/3315; G06F 1/26; G06F 2119/04; G06F 2119/18; G06F 30/00; G06F 30/23; G06F 30/31; G06F 30/3308; G06F 30/3312; G06F 30/3323; G06F 1/266; G06F 11/2289; G06F 11/267; G06F 15/7867; G06F 2117/12; G06F 2119/16; G06F 30/34; G06F 7/76; G06F 1/28; G06F 1/30; G06F 1/3203; G06F 13/20; G06F 2213/40; G06F 30/3953; H01L 27/11807; H01L 29/0653; H01L 2027/11875; H01L 2027/11881; H01L 23/5225; H01L 27/0207; H01L 23/528; H01L 21/823871; H01L 23/585; H01L 23/5227; H01L 51/0558
USPC .................................................. 716/110–117
See application file for complete search history.

(56) References Cited

U.S. PATENT DOCUMENTS

| | | | | |
|---|---|---|---|---|
| 8,423,946 B1* | 4/2013 | Jin | .......................... | G06F 30/30 |
| | | | | 716/132 |
| 2012/0280287 A1* | 11/2012 | Hou | .................. | H01L 27/11807 |
| | | | | 257/288 |
| 2018/0102354 A1* | 4/2018 | Wang | .................. | H01L 23/5286 |

\* cited by examiner

POWER RAIL DESIGN METHOD, APPARATUS AND NON-TRANSITORY COMPUTER READABLE MEDIUM THEREOF

CROSS-REFERENCE TO RELATED APPLICATION

This application claims priority to Taiwan Application Serial Number 108138294, filed Oct. 23, 2019, which is herein incorporated by reference in its entirety.

BACKGROUND

Technical Field

The present disclosure generally relates to an integrated circuit design technique, and, more particularly, to a power rail design method, a power rail design apparatus and a non-transitory computer readable medium for designing the power rail.

Description of Related Art

Critical electromigration and voltage degradation tend to happen on power rails. When a power plan is performed, previous methods mostly used more routing resources for the power plan, for example, by increasing the power rails from one metal layer to two metal layers, for reducing the negative impact caused by electromigration and voltage degradation on the power rails. However, using more metal layers can make the routing resources less, increasing the difficulty of the design.

Thus, how to design a new power rail design method and apparatus and a non-transitory computer-readable medium for the power rail design is an urgent issue in the industry.

SUMMARY

The purpose of the present disclosure is to provide a power rail design method, a power rail design apparatus, and a non-transitory computer-readable medium for the power rail design to improve the problems of the prior art.

In order to achieve the above purpose, a technical aspect of the present disclosure relates to a method, including: identifying power rails and corresponding power domains in an integrated circuit design file; performing a design rule check (DRC) for circuit units in the integrated circuit design file, to retrieve non-violating circuit regions corresponding to the power rails in each of the power domains; and widening the power rails corresponding to at least part of the non-violating circuit regions in the integrated circuit design file for the power rails to occupy at least part of the non-violating circuit regions.

Another technical aspect of the present disclosure relates to an apparatus, including a memory and a processor. The memory is configured to store computer-executable instructions. The processor is electrically coupled to the memory and configured to retrieve and execute the computer-executable instructions, to execute steps including: identifying the power rails and the corresponding power domains in the integrated circuit design file; performing a design rule check (DRC) for circuit units in the integrated circuit design file to retrieve non-violating circuit regions corresponding to the power rails in each of the power domains; and widening power rails corresponding to at least part of the non-violating circuit regions in the integrated circuit design file for the power rails to occupy at least part of the plurality of non-violating circuit regions.

Another technical aspect of the present disclosure relates to a non-transitory computer-readable medium, including computer-readable instructions that are executable by a processor of a computer system for performing steps. The steps include: identifying the power rails and the corresponding power domains in the integrated circuit design file; performing a design rule check (DRC) for circuit units in the integrated circuit design file to retrieve non-violating circuit regions corresponding to the power rails in each of the power domains; and widening the power rails corresponding to at least part of the non-violating circuit regions in the integrated circuit design file for the plurality of power rails to occupy at least part of the non-violating circuit regions.

The power rail design method, the power rail design apparatus and the non-transitory computer-readable medium for the power rail design of the present disclosure can, according to the non-violating circuit regions of the circuit units, widen the power rails after performing the design rule check, to improve an electrical performance of the power rails.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
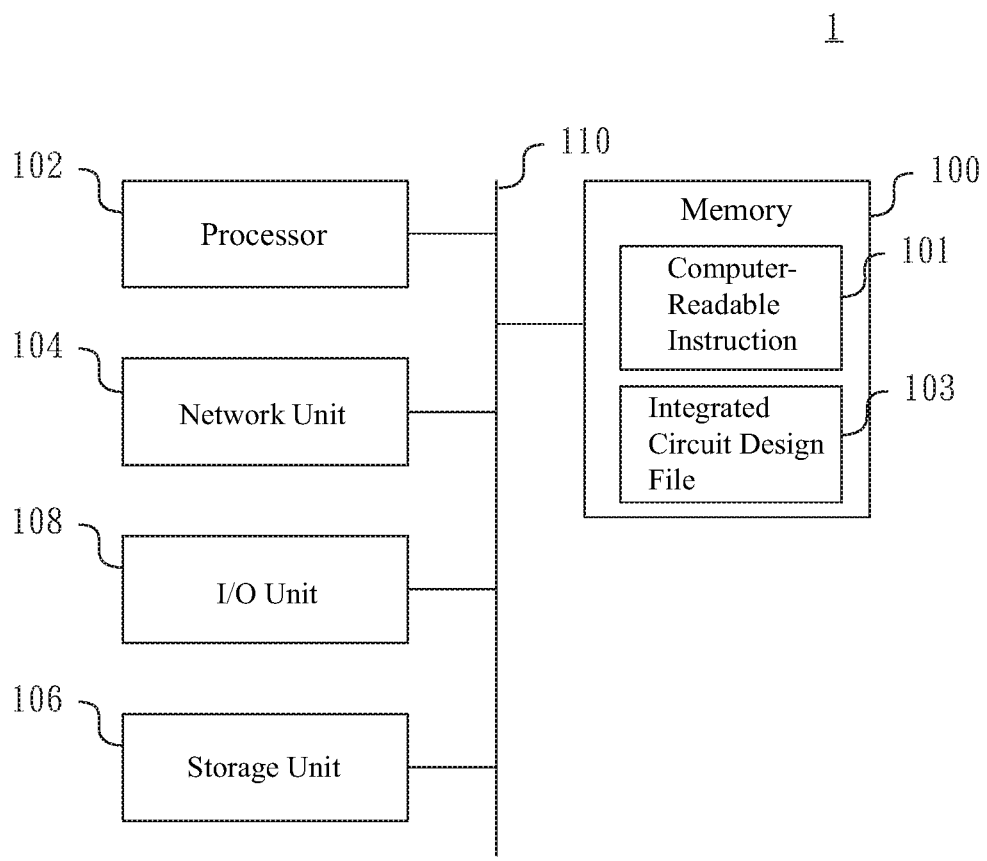
FIG. 1 is a block diagram of a power rail design apparatus, in accordance with one embodiment of the present disclosure.

Reference is made to FIG. 1. FIG. 1 is a block diagram of a power rail design apparatus 1, in accordance with one embodiment of the present disclosure. The power rail design apparatus 1 includes a memory 100, a processor 102, a network unit 104, a storage unit 106, and an input/output (I/O) unit 108. The above elements can communicate with each other by, for example, but not limited to, a bus 110.

The memory 100 may be any storage device for data storage and may be, for example, but not limited to, a random access memory (RAM), a read only memory (ROM), a flash memory, a hard disk, or other storage devices for data storage. The memory 100 is configured to at least store computer-readable instructions 101. In one embodiment, the memory 100 can also be configured to store temporary data which is generated when the processor 102 performs operations.

The processor 102 is electrically coupled to the memory 100 and configured to retrieve the computer-readable instructions 101 from the memory 100, to control the elements of the power rail design apparatus 1 to perform functions of the power rail design apparatus 1.

Among them, the network unit 104 is configured to perform network access under a control of the processor 102. The storage unit 106 may be, for example, but not limited to, a magnetic disk or an optical disk, to store data or instructions under the control of the processor 102. The I/O unit 108 may be operated by a user, to communicate with the processor 102 in order to input and output data.

Figure 2:
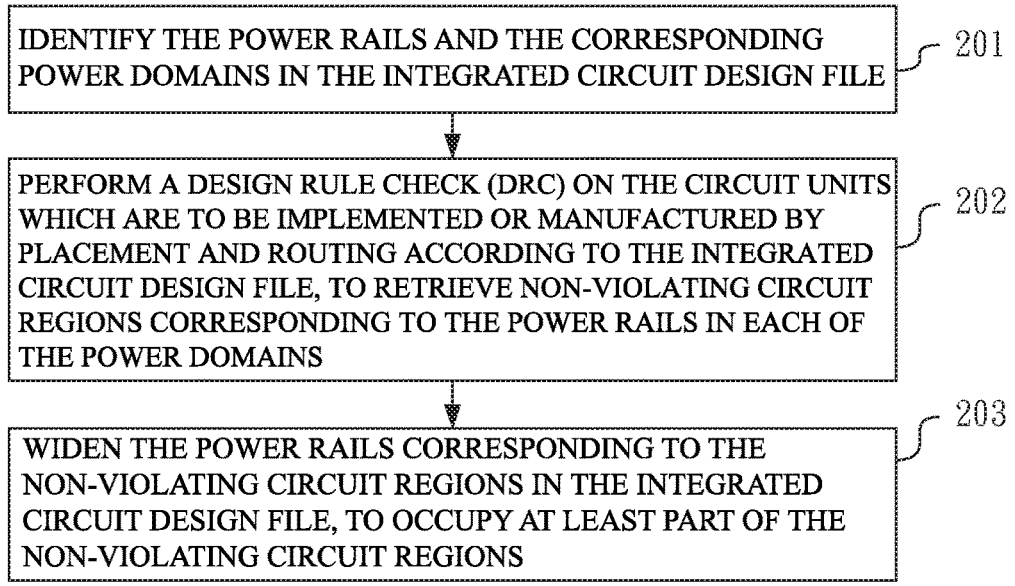
FIG. 2 is a flow chart of a method for designing power rails, in accordance with one embodiment of the present disclosure.

Reference is made to FIG. 2. FIG. 2 is a flow chart of a power rail design method 200, in accordance with one embodiment of the present disclosure. The power rail design method 200 is applicable to the power rail design apparatus 1 shown in FIG. 1 or implemented by other hardware elements (e.g., databases, general processors, computers, servers, or other unique hardware devices with particular logic circuits or apparatus with particular functions, in which, for example, codes and the processors/chips are integrated into a unique hardware). More particularly, the power rail design method 200 may be implemented by using a computer program, to control each of the elements of the power rail design apparatus 1. The computer program may be stored in a non-transitory computer-readable storage medium, such as a ROM, the flash memory, floppy disks, the hard disks, the optical disks, flash drives, magnetic tapes, network-accessible databases or a computer-readable recording medium with the same functions in which those skilled in the art can easily contemplate.

The power rail design method 200 includes following steps. It is to be understood that unless orders are otherwise specified herein, the orders of the steps mentioned in the embodiment may be adjusted and even be performed simultaneously or partially according to actual applications.

In step 201, in an integrated circuit design file 103, power rails and corresponding power domains are identified.

In one embodiment, the integrated circuit design file 103 may be stored in, but not limited to, the memory 100 and retrieved by the processor 102. The integrated circuit design file 103 includes different circuit units and design information for the power rails.

Figure 3:
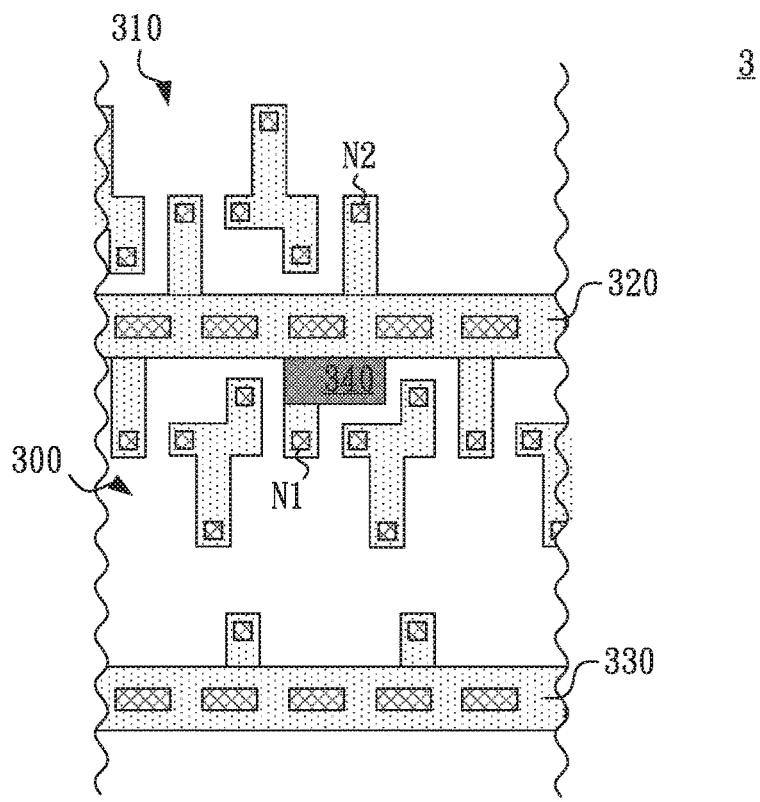
FIG. 3 is a layout diagram of an integrated circuit, in accordance with one embodiment of the present disclosure.

Reference is now made to FIG. 3. FIG. 3 is a layout diagram of an integrated circuit 3, in accordance with one embodiment of the present disclosure.

The integrated circuit 3 includes the circuit units and the power rails. In FIG. 3, circuit units 300, 310 and power rails 320, 330 are exemplarily illustrated.

In various embodiments, the circuit units 300 and 310 may be various logic operation gates, operation units or other circuits with the particular functions, to perform the operations and process for data being inputed. In one embodiment, these circuit units 300 and 310 are standard cells which are the smallest circuit units.

The power rails 320 and 330 are electrically coupled to the circuit units 300 and 310 through power contacts such as contacts N1 and N2 respectively. In one embodiment, one of the power rails 320 and 330 is connected to a power line of an ungrounded voltage source (not shown), to provide power to the circuit units 300 and 310 by the voltage source. The other one of the power rails 320 and 330 is connected to a ground line of a ground voltage (not shown), to provide the ground voltage to the circuit units 300 and 310.

For the circuit units 300 and 310 with different needs, the power rails 320 and 330 may provide the power with different voltages, or the same voltage but from different power sources. Therefore, when the circuit units 300 and 310 operate according to the different powers, the circuit units 300 and 310 will belong to the different power domains respectively.

In step 202, a design rule check (DRC) is performed on the circuit units 300 and 310 which are to be implemented or manufactured by placement and routing according to the integrated circuit design file 103, to retrieve non-violating circuit regions 340 corresponding to the power rails 320 and 330 in each of the power domains. Such placement and routing may be performed by electronic design automation (EDA) tools.

For placements that all comply with a design rule, the circuit units 300 and 310 often have a flexible space, without being filled with metal. Therefore, after the circuit units 300 and 310 are implemented or manufactured by placement and routing and are performed with the design rule check, several non-violating circuit regions are obtained, in which at least part of the non-violating circuit regions is adjacent to and corresponds to the power rails 320 and 330. For example, the non-violating circuit regions 340 are illustratively shown in FIG. 3.

In step 203, in the integrated circuit design file 103, the power rails 320 and 330 corresponding to the non-violating circuit regions 340 are widened, to occupy at least part of the non-violating circuit regions 340.

Since the non-violating circuit regions 340 do not violate a design rule, the non-violating circuit regions 340 may be utilized to widen the power rails 320 and 330, and the power rails 320 and 330 are able to extend to the non-violating circuit regions 340.

In one embodiment, the power rails 320 and 330 are widened according to the belonged power domains. For example, when the power rails 320 and 330 receive the power from the voltage source, a widened part of the power rails 320 and 330 is also configured to receive the power from the voltage source. When the power rails 320 and 330 receive the ground voltage, the widened part of the power rails 320 and 330 is also configured to receive the ground voltage.

In one embodiment, if all of the non-violating circuit regions 340 are configured for widening the power rails 320 and 330, it will affect a flexibility of an integrated circuit design and modification. Thus, in one embodiment, the circuit units 300 and 310 in the integrated circuit design file 103 may be analyzed, to widen only the non-violating circuit regions 340 that are selected according to the analysis results.

Figure 4:
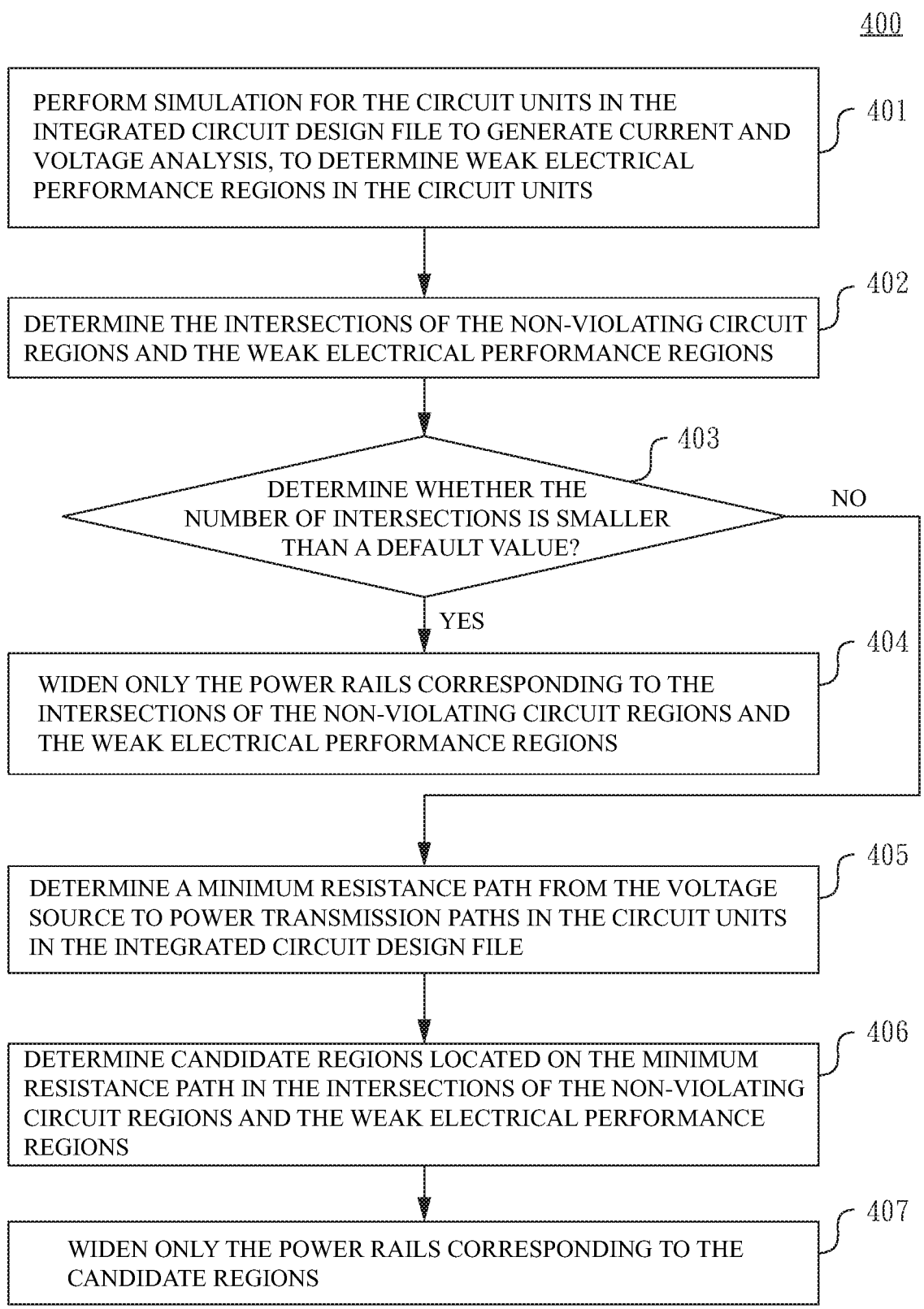
FIG. 4 is a flow chart of a method for performing a step in FIG. 2, in accordance with one embodiment of the present disclosure.

Reference is made to FIG. 4. FIG. 4 is a flow chart of a method 400 for performing the step 203 in FIG. 2, in accordance with one embodiment of the present disclosure.

In step 401, after retrieving the non-violating circuit regions 340, a simulation for the circuit units 300 and 310 in the integrated circuit design file 103 is performed, to determine weak electrical performance regions in the circuit units 300 and 310. The weak electrical performance regions are regions which are vulnerable to voltage drop and/or electromigration (EM).

In step 402, intersections of the non-violating circuit regions 340 and the weak electrical performance regions are determined.

In step 403, whether a number of the intersections is smaller than a default value is determined.

In step 404, when the number of the intersections is smaller than the default value, only the power rails 320 and 330 corresponding to the intersections of the non-violating circuit regions 340 and the weak electrical performance regions are widened.

And when the number of the intersections is not less than the default value, a result promptly represents the number of the intersections of the non-violating circuit regions 340 and the weak electrical performance regions is still too much.

In that case, in step 405, a minimum resistance path from the voltage source (e.g., the voltage source connected via power rails 320 and 330) to power transmission paths in the circuit units 300 and 310 in the integrated circuit design file 103 is determined. With the above, it is easier to pass a larger current on the minimum resistance path in the present disclosure.

In step 406, in the intersections of the non-violating circuit regions 340 and the weak electrical performance regions, candidate regions located on the minimum resistance path are determined.

In step 407, the power rails 320 and 330 corresponding to the candidate regions are widened only.

The power rail design method, the power rail design apparatus and the non-transitory computer-readable medium for the power rail design of the present disclosure can, according to the non-violating circuit regions of the circuit units, widen the power rails after performing the design rule check. Under a condition of not occupying routing resources ahead of a routing phase and not violating the design rule, problems of voltage drop and electromigration on the power rails are solved effectively.

Although the preferred embodiments of the present disclosure are disclosed above, they are not intended to limit the disclosure. Any person skilled in the art will be able to make some modifications and refinements without departing from the spirit and scope of the disclosure, and the scope of the disclosure is to be determined by the scope of the appended claims.

What is claimed is:

1. A method comprising:
   identifying a plurality of power rails and a plurality of corresponding power domains in an integrated circuit design file;
   performing a design rule check (DRC) for a plurality of circuit units in the integrated circuit design file to retrieve a plurality of non-violating circuit regions corresponding to the plurality of power rails in each of the plurality of power domains;
   widening the plurality of power rails corresponding to at least part of the plurality of non-violating circuit regions in the integrated circuit design file for the plurality of power rails to occupy at least part of the plurality of non-violating circuit regions, wherein the plurality of power rails are electrically coupled to the circuit units, the plurality of non-violating circuit regions are in the circuit units and adjacent to the plurality of power rails;
   performing a simulation for the plurality of circuit units to generate a current and voltage analysis, to determine a plurality of weak electrical performance regions in the plurality of circuit units;
   determining whether or not a number of a plurality of intersections of the plurality of non-violating circuit regions and the plurality of weak electrical performance regions is smaller than a default value;
   only widening the plurality of power rails corresponding to a plurality of intersections of the plurality of non-violating circuit regions and the plurality of weak electrical performance regions when the number of the intersections is smaller than the default value; and
   only widening the plurality of power rails corresponding to a plurality of candidate regions located on a minimum resistance path, in the plurality of intersections of the plurality of non-violating circuit regions and the plurality of weak electrical performance regions when the number of the intersections is not smaller than the default value.

2. The method of claim 1, wherein
   the plurality of weak electrical performance regions are regions which are vulnerable to voltage drop and/or electromigration (EM).

3. The method of claim 1, further comprising:
   determining the minimum resistance path from a voltage source to a plurality of power transmission paths in the plurality of circuit units in the integrated circuit design file; and
   determining the plurality of candidate regions located on the minimum resistance path, in a plurality of intersections of the plurality of non-violating circuit regions and a plurality of weak electrical performance regions.

4. The method of claim 1, wherein
   the plurality of power rails are a power line and a ground line respectively.

5. The method of claim 1, wherein
   the circuit units are to be implemented by placement and routing according to the integrated circuit design file.

6. An apparatus, comprising:
   a memory configured to store a plurality of computer-executable instructions; and
   a processor electrically coupled to the memory and configured to retrieve and execute the plurality of computer-executable instructions, to execute steps comprising:
   identifying a plurality of power rails and a plurality of corresponding power domains in an integrated circuit design file;
   performing a design rule check (DRC) for a plurality of circuit units in the integrated circuit design file to retrieve a plurality of non-violating circuit regions corresponding to the plurality of power rails in each of the plurality of power domains;
   widening the plurality of power rails corresponding to at least part of the plurality of non-violating circuit regions in the integrated circuit design file for the plurality of power rails to occupy at least part of the plurality of non-violating circuit regions, wherein the plurality of power rails are electrically coupled to the circuit units, the plurality of non-violating circuit regions are in the circuit units and adjacent to the plurality of power rails;
   performing a simulation for the plurality of circuit units to generate a current and voltage analysis, to determine a plurality of weak electrical performance regions in the plurality of circuit units;
   determining whether or not a number of a plurality of intersections of the plurality of non-violating circuit regions and the plurality of weak electrical performance regions is smaller than a default value;
   only widening the plurality of power rails corresponding to a plurality of intersections of the plurality of non-violating circuit regions and the plurality of weak electrical performance regions when the number of the intersections is smaller than the default value; and
   only widening the plurality of power rails corresponding to a plurality of candidate regions located on a minimum resistance path, in the plurality of intersections of the plurality of non-violating circuit regions and the plurality of weak electrical performance regions when the number of the intersections is not smaller than the default value.

7. The apparatus of claim 6, wherein
   the plurality of weak electrical performance regions are regions which are vulnerable to voltage drop and/or electromigration (EM).

8. The apparatus of claim 6, wherein the power rail design method further comprises:
  determining the minimum resistance path from a voltage source to a plurality of power transmission paths in the plurality of circuit units in the integrated circuit design file; and
  determining the plurality of candidate regions located on the minimum resistance path in a plurality of intersections of the plurality of non-violating circuit regions and a plurality of weak electrical performance regions.

9. The apparatus of claim 6, wherein
  the circuit units are to be implemented by placement and routing according to the integrated circuit design file.

10. A non-transitory computer-readable medium comprising a plurality of computer-readable instructions that are executable by a processor of a computer system for performing steps comprising:
  identifying a plurality of power rails and a plurality of corresponding power domains in an integrated circuit design file;
  performing a design rule check (DRC) for a plurality of circuit units in the integrated circuit design file to retrieve a plurality of non-violating circuit regions corresponding to the plurality of power rails in each of the plurality of power domains;
  widening the plurality of power rails corresponding to at least part of the plurality of non-violating circuit regions in the integrated circuit design file for the plurality of power rails to occupy at least part of the plurality of non-violating circuit regions, wherein the plurality of power rails are electrically coupled to the circuit units, the plurality of non-violating circuit regions are in the circuit units and adjacent to the plurality of power rails;
  performing a simulation for the plurality of circuit units to generate a current and voltage analysis, to determine a plurality of weak electrical performance regions in the plurality of circuit units;
  determining whether or not a number of a plurality of intersections of the plurality of non-violating circuit regions and the plurality of weak electrical performance regions is smaller than a default value;
  only widening the plurality of power rails corresponding to a plurality of intersections of the plurality of non-violating circuit regions and the plurality of weak electrical performance regions when the number of the intersections is smaller than the default value; and
  only widening the plurality of power rails corresponding to a plurality of candidate regions located on a minimum resistance path, in the plurality of intersections of the plurality of non-violating circuit regions and the plurality of weak electrical performance regions when the number of the intersections is not smaller than the default value.

11. The method of claim 10, wherein
  the circuit units are to be implemented by placement and routing according to the integrated circuit design file.

* * * * *